Feb. 13, 1968     W. J. SMITH ET AL     3,368,755
HUMIDITY SENSING ELEMENT
Original Filed May 12, 1964
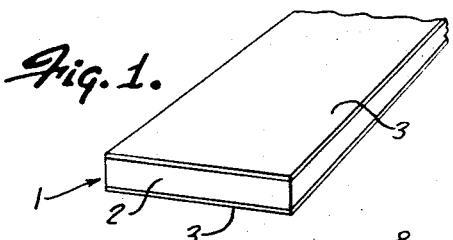
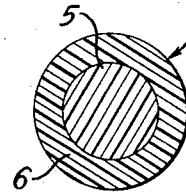
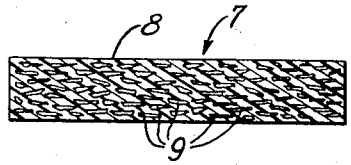
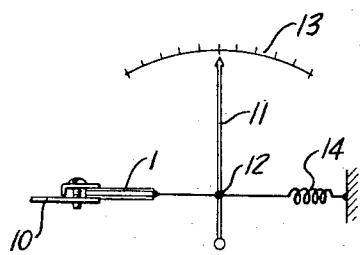
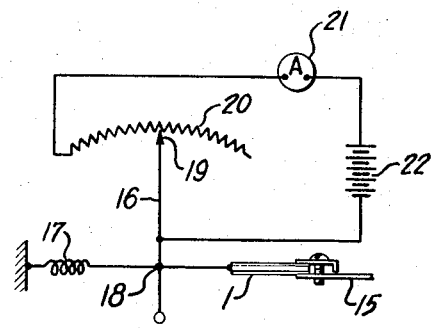
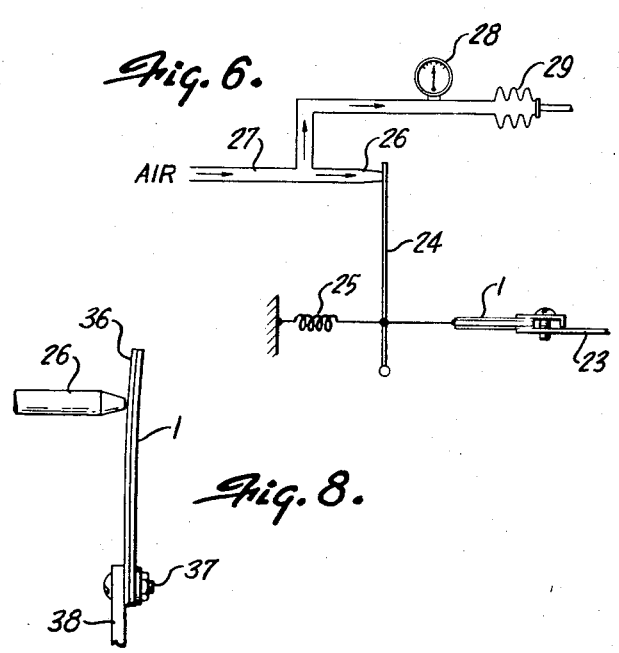
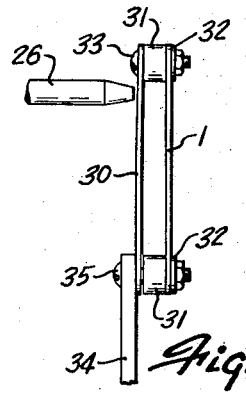
INVENTORS.
RIENZI B. PARKER
WALTER J. SMITH
BY
Andrus & Starke
ATTORNEYS

United States Patent Office 3,368,755
Patented Feb. 13, 1968

3,368,755
HUMIDITY SENSING ELEMENT
Walter J. Smith, Arlington, and Rienzi B. Parker, Weston, Mass., assignors, by mesne assignments, to Johnson Service Company, Milwaukee, Wis., a corporation of Wisconsin
Original application May 12, 1964, Ser. No. 366,819. Divided and this application Nov. 14, 1966, Ser. No. 593,804
7 Claims. (Cl. 236—44)

ABSTRACT OF THE DISCLOSURE

The invention relates to a synthetic humidity sensing element comprising a moisture-insensitive, creep-resistant core and an outer moisture sensitive layer which is bonded to opposite surfaces of the core throughout its length. One end of the element is connected to a fixed support, while an operating member is secured to the opposite end of the element and is operably connected to a load or working device which operates to either indicate through a dial the calibrated degree of moisture in the atmosphere, or alternately to actuate a humidity control device.

Variations in the relative humidity cause the moisture sensitive element to expand and contract linearly to thereby actuate the operating member to either indicate the relative humidity or operate the humidity control device.

---

This application is a division of application Ser. No. 366,819, filed May 12, 1964, now Pat. No. 3,301,057.

This invention relates to improved varying-dimension humidity sensing elements for use in humidity control and/or indication systems, and to a method of fabricating the element.

Humidity sensitive elements are sensitive to changes in the moisture content of air and respond in the form of dimensional changes to variations in humidity. Generally, it is preferable for the dimensional change occurring in the humidity sensing element to be directly proportional to the variations in the relative humidity. In addition, the humidity sensing element should have a fast-response to moisture changes, should be reproducible in order to obtain uniformity in element-to-element performance, should have a minimum hysteresis and should not be affected deleteriously by extreme conditions of humidity and temperatures.

In the past, human hair, wood, goldbeater's skin, and animal horn have been used as humidity sensing elements. With all of these elements except wood, the element is clamped at one end while the other end is subjected to a light, resilient force. The element is attached to an operating mechanism and changes in dimension of the element resulting from humidity changes produce a signal which can be used to indicate, through a dial, the calibrated degree of moisture content in the atmosphere or, alternately, to actuate a humidity control device.

The wood element normally consists of two laminated layers of wood with the grain in each layer extending in the opposite direction from the grain in the other layer. The wood humidity sensing element is usually employed in a cantilever form with the element being clamped or held at only one end. Changes in the relative humidity produce a bending in the laminated element, and the bend is utilized to initiate or change a signal to thereby register the relative humidity or actuate a humidity control device.

All of these humidity sensing elements have certain inherent disadvantages such as fragility and are often damaged in shipment. More important, however, these elements are difficult to produce. This is particularly true of the horn element for it requires a very precise operation to cut the horn material into thin layers of uniform thickness. Since all of these conventional elements are natural occurring, it is difficult to obtain uniform performance from element-to-element, and uniformity can only be obtained through very careful calibration. In addition, they generally do not retain their original calibration after long term exposure to extremes of humidity and in many cases require recalibration.

The present invention is directed to a synthetic, varying-dimension, humidity sensing element which overcomes the inherent disadvantages of the natural occurring elements.

More specifically, the humidity sensing element of the invention comprises a moisture insensitive, creep-resistant base portion or core with an outer moisture-sensitive surface which is bonded to the base throughout its length.

On an increase in moisture in the atmosphere, the moisture sensitive surface absorbs moisture and expands. The expansion of the moisture sensitive surface puts the moisture insensitive core under stress, which resists the expansion of the surface layer. On a decrease in humidity conditions, the moisture sensitive surface layer shrinks and the core acts as a spring to return the moisture sensitive surface layer to its original dimension for the original relative humidity. The moisture sensitive surface, and the moisture insensitive core, cooperate to provide a humidity sensing element having a rapid response to humidity conditions and a characteristic not affected by extremes of humidity or temperature. The element has very little hysteresis and is substantially more stable than the humidity sensing elements used in the past.

As the element is a synthetic product, it can be fabricated under controlled conditions and therefore requires less calibration from element-to-element.

The drawings illustrate the best mode presently contemplated of carrying out the invention.

Other objects and advantages will appear in the course of the following description.

In the drawings:

FIG. 1 is a perspective view of the humidity sensing element of the invention;

FIG. 2 is a modified form of the element in which an annular moisture sensitive layer surrounds the core;

FIG. 3 is a second modified form of the invention in which the moisture sensitive material is distributed as particles throughout the core;

FIG. 4 is a schematic representation showing the humidity sensing element in a mechanical-type humidity indicating device;

FIG. 5 is a schematic representation showing the element in an electrical-type humidity indicating device;

FIG. 6 is a schematic representation showing the use of the element in a pneumatic-type humidity control device;

FIG. 7 is a schematic representation of a modified form of the humidity sensing element as used in a pneumatic control device; and FIG. 8 is a schematic representation, similar to FIG. 7, showing a further modified form of the element as used in a pneumatic control device.

FIG. 1 illustrates a humidity sensing element 1 comprising an inner core 2 and outer surfaces 3 which are integral with the core.

The core 2 is formed of a material which is relatively insensitive to moisture, and capable of withstanding the mechanical load with insignificant creep. Actually, the core need not be completely insensitive to moisture but should have a dimensional increase of less than 2%, and preferably less than 1%, with a change from 0% to 100% relative humidity.

Since the moisture sensitivity of the core 2 does not contribute to performance, the primary function of the core is the complete restoration from expansion or contraction experienced under high humidity conditions and induced by the outer surfaces 3. In other words, the core material should be resistant to creep or permanent deformation and should recover substantially completely from elongations up to 5%.

The core 2 can be formed of organic or inorganic materials. Organic polymers having a minimum number of polar groups, such as hydroxyl, carboxyl, amino and imino, can be used as the core material. Organic polymers which can be utilized as the core are cellulose esters in which the esterifying acids contain up to 8 carbon atoms and preferably up to 6 carbon atoms. Specific examples of esters are cellulose triacetate, cellulose acetate-butyrate, cellulose acetate-propionate, cellulose acetate-valerate, cellulose butyrate, cellulose succinate, cellulose phthalate, and the like. It is preferred that the cellulose be substantially 100% esterified so that a minimum number of hydroxyl groups remain in the molecule. Thus, cellulose triacetate is preferred over cellulose monoacetate or cellulose diacetate.

Other organic materials which can be used as the core are polycarbonate films; copolymers of vinylene carbonate and vinyl acetate having approximately 30 mol percent vinylene carbonate; polyacetal films such as Delrin (E. I. du Pont de Nemours and Co.); oriented polyester films such as Mylar (E. I. du Pont de Nemours and Co.) and Kodar (Eastman Kodak Co.); oriented polyolefin films such as polyethylene or polypropylene, and the like.

In some cases inorganic polymers, where the chain structure is based on sulfur, phosphorus, silica, or boron, can be used. Furthermore, metal films can be used as the core material, particularly when the element is fixed or clamped only at one end as in a cantilever construction.

The outer surface layers 3 should be formed of materials which have a high sensitivity to moisture and respond in the form of dimensional changes to moisture changes. Generally, the outer layers 3 should have a moisture sensitivity such that the material will show a dimensional increase of at least 3%, and preferably 4% to 7%, with a change from 0% to 100% relative humidity. These sensitivity values are based on the outer surface material disassociated from the core and need be in only one dimension. The outer surface material should absorb at least 10% of its own weight upon immersion in liquid water in accordance with ASTM D-570 test procedure.

Generally speaking, the outer layer 3 will be formed of a material characterized by having molecular chains with long, bulky repeat units, inhibited rotation of the chain segments and polar groups, such as hydroxyl, carboxyl, imino and amino. These characteristics result in repeatable dimensional changes, high diffusional transport rates for water, and dependence of linear dimension on relative humidity independent of temperature.

Specific examples of moisture sensitive materials which can be used as the outer surface layer 3 are cellulose, hydroxyethyl cellulose, carboxymethyl cellulose, cellulose derivatives such as cellulose ethers, gelatin, polyvinyl alcohol, polyacrylamide, polyacrylic acid, keratin, collagen, starch and starch derivatives, regenerated proteins such as casein and zein, synthetic materials such as polyvinyl pyrrolidone and modified nylon, and the like.

The thickness of the core has a definite relation to the thickness of the outer layers 3. If the core is too thick with respect to the thickness of the outer layers 3, the films or layers 3 cannot provide the necessary dimensional change under changes in atmospheric moisture. Conversely, if the core is too thin with respect to the thickness of the outer layers 3, the core will not provide the necessary resiliency to restore the layers 3 to their original dimension and prevent permanent deformation of the outer layers. For an element having rapid response, the thickness of each of the layers 3 should be less than 0.5 mil and should generally be between 5% to 50% of the thickness of the core 2 with about 10% to 20% being preferred. However, this relationship is variable. For example, if the moisture sensitivity of the outer layer 3 is high and the core 2 is formed of a material having a low modulus, then the core can be relatively thick. The optimum thickness ratio for a given surface material and core material is dependent on the particular application and is generally arrived at experimentally.

It is preferred that the core 2 and the outer layers 3 be coextensive in length and width. However, in some instances, either the core or the outer layers 3 may project beyond the other member of the element and the function of the elements will not be altered. Any mechanical clamping of the element in use must, however, be directly linked with the core and not solely attached to the surface layers 3.

While FIG. 1 illustrates the layers 3 being on both surfaces of the core 2, it is contemplated that the layer 3 may only be on one surface of the core. In this case, the element would tend to bow or curve under changes in humidity conditions rather than move linearly, as it does when both surfaces are absorptive.

The core 2 and films 3 are bonded together throughout their length, and various methods may be employed to provide the bond between the members. For example, the outer films 3 can be developed by chemical treatment of the surface of the core. Alternately, the layers 3 can be applied by coating the core with a solvent solution of the moisture sensitive material, and subsequently evaporating the solvent. As a third method, the moisture sensitive layer or film 3 can be bonded to the core 2 by use of auxiliary adhesives or can be applied to the core by fusion.

It is preferred that the layers 3 and the core 2 have coefficients of thermal expansion which are similar because differences in the coefficient of thermal expansion between the core and layers 3 will introduce interface stresses. If organic polymers are used as the core and outer layers, the coefficients of thermal expansion will vary little from polymer to polymer, being generally in the range of 1 to $10 \times 10^{-5}$ inches/inch/° F. The coefficients of thermal expansion should also be relatively low to reduce the effect of temperature on the elements' performance.

It has been found that a cellulose ester core having its outer surface hydrolyzed to regenerated cellulose, provides an excellent humidity sensing element. The cellulose ester core can be subjected to the influence of either an alkaline or an acid medium to hydrolyze substantially all of the acid radicals on the surface layer to thereby obtain a regenerated cellulose film which provides a maximum moisture sensitivity. The hydrolyzation can be accomplished by dipping the cellulose ester core into the alkali or acid bath and maintaining it in the bath for a period of time sufficient to hydrolyze the acid groups on the surface of the core. Alkaline materials which can be employed for the hydrolyzation are aqueous or alcoholic solutions of alkali metal bases, such as sodium hydroxide, potassium hydroxide or lithium hydroxide. Alternately, alcoholic solutions of strong organic bases, such as tetramethyl quanidine, trimethyl amine, benzyltrimethyl ammonium hydroxide can be used for the hydrolyzation.

Hot alkaline solutions are preferred to increase the reaction rate, and generally a boiling solution is used. The time of contact or immersion in the alkaline solution depends, of course, on the materials used, the temperature and strength of the solution. For example, a two-hour hydrolysis period using a 5% sodium hydroxide solution was required to hydrolyze a mixed cellulose ester core to produce a satisfactory element. By increasing the strength of the solution to 50%, an almost immediate hydrolyzation occurred. The most effective reaction conditions were found to be obtained by immersing the core material in a boiling 40% sodium hydroxide solution for four minutes.

After treatment with the alkaline solution, it is preferred to neutralize the element in a weak acid solution.

Any conventional mineral acid, such as hydrochloric acid or sulphuric acid can be used. The neutralization removes all of the alkali metal ions which tend to increase the sensitivity of the composite element, but lower the response rate increase of the hysteresis and decrease the reproducibility of the element.

After the neutralization, the element is preferably rinsed in water to leach out the resulting salt.

Solutions of mineral acids, such as hydrochloric acid and sulphuric acid, can also be used to hydrolyze the cellulose ester. However, the use of alkaline material provides a faster hydrolyzation and is preferred. If the hydrolyzation is performed by use of an acidic material, the hydrolyzed product is dipped in an alkaline solution to neutralize the acid and subsequently subjected to the water rinse.

The hydrolyzation treatment can also be employed to provide a moisture sensitive outer layer on a core consisting of a copolymer of vinylene carbonate and vinyl acetate. The unhydrolyzed copolymer is a tough dimensionally stable film with little sensitivity to moisture. By hydrolyzing the outer surface of the copolymer with an alkaline material, as described above, a film or layer 3 is produced which is sensitive to relative humidity.

In place of the chemical treatment of the core material, the moisture sensitive outer surfaces can be cast from solvent solutions. In this case, the solution of the moisture sensitive material is cast or applied to the surface of the core material in the form of a thin film. The composite material is then dried at an elevated temperature to evaporate the solvent. The resulting product has a moisture sensitive surface firmly bonded to the moisture insensitive core material.

The composite laminated humidity sensing element, as shown in FIG. 1, functions differently from the humidity sensing element conventionally used in humidistats or other humidity sensing devices. In the element of the invention, the moisture sensitive outer layers will absorb moisture on an increase in humidity and tend to swell or expand. This expansion is resisted by the inner core, which is relatively insensitive to moisture, and tends to stress the core material. On a decrease in moisture conditions, the outer layers will shrink, releasing the tension on the core, with the result that the core will restore or pull the outer layers back to their original condition or dimension. Without the spring effect of the core material 2, the outer layers 3 would not regain their original dimension on contraction with decreasing moisture conditions. The creep resistant inner core provides the stability which cannot be achieved in the moisture sensitive layer itself.

The composite element 1 has a rapid response to moisture changes and shows a hysteresis less than 5% of total response, while at the same time does not exhibit the erratic performance of a naturally occurring material such as horn or hair. As the element is synthetically produced, it can be manufactured under controlled conditions and thus requires less calibration from element-to-element.

FIG. 2 shows a modified form of the invention in which the humidity sensing element 4 comprises a central core 5 and a surrounding annular outer layer 6. In this embodiment, the core 5 is formed of a material similar to that described with respect to core 2 of the first embodiment, and similarly, the outer layer 6 is formed of a material in the manner described with respect to the outer layers 3.

The humidity sensing element, shown in FIG. 2, operates identical to that shown in FIG. 1. Variations in moisture conditions cause expansion and shrinkage of the outer film 6, and the central core 5 serves as a spring to return the film to its original dimension and maintain stability and prevent hysteresis.

FIG. 3 shows a second modified form of the invention in which the humidity sensing element 7 comprises a matrix or core 8 having a plurality of finely divided particles of a moisture sensitive material 9 dispersed therein. The core material 8 is similar in structure and function to the core material 2, described in the first embodiment, and similarly, the moisture sensitive material 9 is formed of a material similar to the outer layers 3 of the first embodiment. The element shown in FIG. 3 functions in a manner similar to that of FIG. 1, with the moisture sensitive particles 9 changing dimension under moisture changes, and the moisture insensitive core or carrier phase tending to resist this change and act as a spring to return the particles 9 to their original dimension.

The dispersed phase, indicated by the particles 9, is preferably interconnected and exposed to the atmosphere so as to improve moisture transmission to the moisture sensitive particles 9.

FIGS. 4–6 illustrate humidity devices incorporating the element of the invention. FIG. 4 is a schematic representation showing a simple, mechanical-type, humidity indicator. In this embodiment, one end of the moisture sensitive element 1 is permanently anchored to a fixed support 10. The opposite end of the element 1 is attached to a pointer 11 which is pivotally mounted at 12 and is adapted to move along a scale 13. The sensing element 1 is held under light tension by a spring 14. With this arrangement, the linear expansion and contraction of the element 1 will tend to pivot the pointer 11 and provide relative humidity readings on the calibrated scale 13.

FIG. 5 illustrates an electrical-type humidity indicator in which one end of the element 1 is permanently fixed to a support 15 and the opposite end of the element is connected to an indicator 16. The indicator 16 is under light tension by a spring 17 and is pivotally mounted at point 18. The opposite end of the indicator is provided with a wiper arm 19 which is adapted to move across a variable resistance element 20 which is connected in an electrical circuit with an ammeter 21 and a source of power 22. Changes in dimension in the element 1 serve to move the wiper arm 19 along the resistance element 20 to vary the current flow and thereby provide an indication of the humidity by the calibrated ammeter, either at the location of the sensing element or at a remote location. Alternately, the varying current in the circuit produced by changes in dimension of the element 1 may be used as an input signal to humidity control equipment.

FIG. 6 shows a pneumatic-type humidity device in which one end of the element 1 is again clamped to a fixed support 23 and the opposite end is connected to a pivotal flap valve 24. The flap valve is under light tension by a spring 25.

The flap valve is adapted to restrict air flow through a nozzle 26 which is connected in air line 27. Change in dimension of the element 1 varies the position of the flap valve 24 to thereby change the air flow through the nozzle 26, causing the air pressure within the line 27 to vary. The resulting pneumatic signal can be used to indicate relative humidity directly through a gauge 28 or to provide a mechanical input to humidification equipment through pressure responsive member, such as bellows 29.

FIG. 7 illustrates a modified form of the humidity sensing element as used in a pneumatic humidity control, similar to that of FIG. 6. In this embodiment, the element 1 is secured in generally parallel spaced relation to a metallic spring 30 which may be formed of phosphorus bronze or the like. The ends of the element 1 and spring 30 are spaced apart by spacing blocks 31 and plates 32 are located on the outer surface of element 1 in alignment with blocks 31. The outer ends of the element 1 and spring 30 are connected to the block 31 by bolt 33, while the inner ends of the members are connected to the corresponding block 31 and to a fixed support or clamp 34 by bolt 35. It is contemplated that adhesives or other fasteners can be used in place of the bolts 33 and 35.

The spring 30 is adapted to be flexed or bowed by expansion and contraction of element 1 to vary the restriction to air flow through nozzle 26 to thereby vary the air pressure in line 27 and provide a pneumatic signal which can be used to indicate relative humidity through gauge 28 or to provide a mechanical input to humidification equipment as previously described.

When the element 1 is in the expanded condition due to the presence of substantial moisture in the atmosphere, the spring 30 will be very nearly straight, having only a slight bow or curvature, and being in engagement with, or in close proximity to, nozzle 26 to restrict the air flow through the nozzle. When the element 1 contracts due to a decrease in moisture in the atmosphere, the spring 30 will bow outwardly away from nozzle 26, thereby increasing the air flow through the nozzle and correspondingly varying the air flow in line 27.

The spacers 31 can be formed of any type of material, such as metal, or the like, which is relatively insensitive to changes in ambient conditions, and the thickness of the spacers determines the ratio of the movement of element 1 to the movement of spring 30. The action involved is similar to a bell crank in that by varying the thickness of spacers 31, the movement of spring 30 per unit movement of element 1 and also the loading on the element required to produce flexing, can be varied.

FIG. 8 illustrates a modified form of the humidity sensing element as used in a pneumatic humidity control. In this embodiment, the element 1 is bonded throughout its length by an adhesive or mechanical fastener to a metallic spring 36 similar in construction and function to spring 30 of FIG. 7. The composite structure is attached by bolt 37 to a fixed support or clamp 38.

Under 100% relative humidity conditions, the composite structure will have a very slight bow and the free end of the structure will be in engagement with, or in close proximity to, nozzle 26, as shown in FIG. 8. As the humidity decreases, the element 1 will contract, thereby bowing the spring 36 away from nozzle 26 to increase the air flow through the nozzle.

The invention may be described in greater detail with reference to the following examples which are meant to be illustrative, but not limiting.

*Example 1*

A 20% film casting solution was made by adding 30 grams of cellulose acetate-butyrate powder to 120 grams of acetone with vigorous stirring. The agitation was continued for about 10 minutes. The solution was then transferred to a storage bottle and allowed to stand for a day to complete air separation before casting films. Film casting was performed on a 12" x 12" No. 18 plate glass plate using a 6" 6-mil Bird applicator. After casting, the film was dried for 10 minutes before stripping. The resulting film thickness was about 1.2 to 1.25 mils after the evaporation of the acetone.

A 9" x 2⅛" sample of the cellulose butyrate film was immersed in 340 ml. of a 40% by weight sodium hydroxide solution in distilled water at a temperature of 240° F. Complete immersion in the solution was assured by weighting the center of the sample. After a reaction time of four minutes, the sample was neutralized in 250 ml. of 0.12 N hydrochloric acid for 10 minutes where the pH was brought to 1.6. Following a tap rinse with water, the sample was air dried at 70° F. and 50% relative humidity under the tension provided by a small paper clamp. The resulting film thickness of the laminar system was 0.90 to 0.95 mil. The loss in thickness of 0.30 mil resulted from surface erosion due to the hydrolysis.

The resulting element was mounted in an air stream of carefully controlled relative humidity and temperature, and the sample showed a 1.6% increase of initial length during an increase of relative humidity from 0% to 100%.

It will be appreciated, of course, that this increase in length in the element itself is intermediate the relatively high increase in length experienced by the outer moisture sensitive layer 3 and the relatively low increase in length experienced by the core 2. In addition, the sample had a low hysteresis and did not exhibit any creep or permanent deformation on repeated variations in the relative humidity.

*Example 2*

A 20% film casting solution was made by adding 30 grams of cellulose triacetate to 120 grams of acetone with vigorous stirring. The solution was permitted to stand for a day to complete air separation and was subsequently cast in a manner similar to that described with respect to Example 1. The resulting film thickness was about 1.2 to 1.25 mils.

The resulting cellulose triacetate film was hydrolyzed by immersing the film for 9 minutes in a boiling solution of 10% sodium hydroxide. Following the hydrolysis, the sample was leached in 250 ml. of 0.12 N hydrochloric acid for 10 minutes and subsequently thoroughly rinsed in tap water. The sample was then dried at 70° F. and 50% relative humidity. The sample was mounted in an air stream of carefully controlled relative humidity and temperature, and the sample of this example showed slightly more hysteresis than that of Example 1, but was superior to animal horn sensors in reliability and stability of calibration.

*Example 3*

A copolymer of vinylene carbonate and vinyl acetate was prepared having approximately 30 mol percent vinylene carbonate and the following chemical structure:

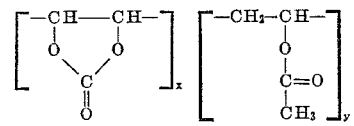

where X and Y are large (perhaps 3 or 4 figure) integers characteristic of film-forming polymers in the ratio of X/Y=7/3.

The copolymer was prepared by a standard emulsion method recovered and cast into a 1 mil. film from acetone.

Subsequently, the film was immersed in a 1% by weight aqueous solution of sodium hydroxide for 6 minutes to hydrolyze the outer surface. After neutralizing with hydrochloric acid and rinsing in the manner set forth in Example 1, the material was dried at 70° F. and 50% relative humidity. The resulting sample showed dimensional sensitivity to relative humidity, good stability of calibration and a low hysteresis.

*Example 4*

A 1 mil. acetate-butyrate film was cast from acetone in the manner described in Example 1. The film was then briefly treated for 2.5 minutes in boiling 5% aqueous sodium hydroxide solution to render the surfaces adherable. Following this, both surfaces of the acetate-butyrate film were coated with a 20% aqueous solution of film-forming gelatin (wet thickness of coating, 5 mils) and air dried at 70° F. and 50% relative humidity.

The resulting sensing element showed a large, repeatable variation of dimension with relative humidity (approximately a 2.6% increase) of initial length during an increase of relative humidity from 0% to 100%, excellent stability of calibration and little hysteresis.

*Example 5*

A cellulose propionate film, approximately 1.5 mils thick was prepared by solvent casting from acetone solution, as described in Example 1. The surfaces of the film were then regenerated to cellulose by immersing the film in a boiling, 5% by weight alcoholic sodium hydroxide solution for two hours.

The composite element was leached for one hour in distilled water, dried and evaluated as a humidity sensing element. The performance of this element was not as linear as that of Example 1, but had good stability and low hysteresis.

Various modes of carrying out the invention are contemplated as being within the scope of the following claims particularly pointing out and distinctly claiming the subject matter which is regarded as the invention.

We claim:

1. A humidity actuated system, comprising a humidity sensing element including a core formed of a material relatively insensitive to moisture changes and being resistant to creep and capable of recovering substantially completely from dimensional increases up to 5% of its initial dimension, an outer organic moisture sensitive layer bonded to opposite surfaces of the core, and being substantially coextensive in dimension with the core, said outer layers formed of a material having a high moisture sensitivity such that the material will show a dimensional increase of more than 3% of its initial dimension with a change of relative humidity from 0% to 100%, means for connecting one end of the element to a fixed support, and operating means secured to the opposite end of said element and operably connected to a load device, said element expanding and contracting linearly with variations in relative humidity to thereby move said operating means to operate said load device in proportion to the variation in relative humidity.

2. The system of claim 1, in which said load device comprises a fluid line having an orifice, and said operating means includes valve means operably associated with said orifice for varying the flow of fluid through said orifice in accordance with movement of the operating means.

3. The system of claim 1, in which said operating means comprises an operating member connected to said opposite end of the element and operably associated said load device in a manner whereby linear contraction of said element moves said operating member to actuate said load device, and resilient means connected to the operating member for urging said operating member in a direction opposite to the direction of contraction of said element and arranged to move said operating member in said opposite direction as the element expands linearly.

4. The system of claim 3, in which the operating member is mounted for pivotal movement and is connected to said humidity sensing element by a flexible connecting member, the outer end of said operating member defining a pointer disposed to provide readings on a scale.

5. The system of claim 3, in which the load device comprises a fluid line having an orifice, and said operating member includes a valve element operably arranged to vary the flow of fluid through said orifice in accordance with expansion and contraction of said humidity sensing element.

6. The system of claim 1, in which the core is a hydrolyzable organic material and said outer layer is produced by hydrolyzing a surface of said core.

7. The system of claim 1, in which the core is cellulose acetate butyrate and the outer layer is cellulose.

References Cited
UNITED STATES PATENTS

| | | | |
|---|---|---|---|
| 1,293,527 | 2/1919 | Orington | 73—337 |
| 1,955,192 | 4/1934 | Kettering | 236—44 X |
| 2,093,767 | 9/1937 | Rollefson | 73—337 |
| 2,280,241 | 4/1942 | Keeler | 236—44 X |
| 2,286,710 | 6/1942 | Bohnstedt | 73—337.5 |
| 2,295,728 | 9/1942 | Gess | 236—44 X |
| 2,604,423 | 7/1952 | Slotterbeck | 73—337 |
| 3,168,829 | 2/1965 | Nelson | 236—44 X |

WILLIAM J. WYE, *Primary Examiner.*